United States Patent

[11] 3,617,877

| | | |
|---|---|---|
| [72] | Inventor | Charles A. Hobson<br>Fremont, Calif. |
| [21] | Appl. No. | 838,166 |
| [22] | Filed | July 1, 1969 |
| [45] | Patented | Nov. 2, 1971 |
| [73] | Assignee | The United States of America as represented by the Secretary of the Navy |

[54] COAXIAL LINE MEASUREMENT DEVICE HAVING METAL STRIP FILTER
6 Claims, 8 Drawing Figs.

[52] U.S. Cl. .................................................. 324/57 R,
328/56, 333/33, 333/84
[51] Int. Cl. .................................................. G01r 27/00
[50] Field of Search ........................................... 324/57,
58.5, 58.5 A, 58.5 C, 52; 328/56; 179/175.3;
333/84 M, 73 S

[56] References Cited
UNITED STATES PATENTS
| 2,883,615 | 4/1959 | Gilbert .......................... | 324/26 |
| 3,031,643 | 4/1962 | Sheftelman .................... | 324/52 X |
| 3,434,049 | 3/1969 | Frye ............................ | 324/52 |

OTHER REFERENCES

Halverson, H., Testing Microwave Transmission Lines Using the Sampling Oscilloscope, In Electronics. June 30, 1961, pp. 86– 88. TK 7800 E58.

Lowe, R. D., Cable Fault Locator, In Hewlett-Packard Journal, June, 1969. pp. 2– 8 (Copy in Group 250, Sub 52).

*Primary Examiner*—Edward E. Kubasiewicz
*Attorneys*—Raymond I. Tompkins and Charles D. B. Curry ABSTRACT: A coaxial line measurement device having a step function generator connected to the input of a coaxial line to be tested. The output of the coaxial line is connected to a sinusoid impedance anomaly device having a metal strip that has a physical configuration corresponding to the signal to be filtered. The step function signal is filtered and then the filtered signal is reflected back through the coaxial line and is compared to a signal from the step function generator that has been filtered and reflected by the sinusoid impedance anomoly device when the coaxial line is removed. The difference in the compared signals indicates the attenuation by the coaxial line under test. The device may be also used to measure the characteristics of antennas.

INVENTOR
CHARLES A. HOBSON
BY Charles P. Curry
ATTORNEY

PATENTED NOV 2 1971 3,617,877

COAXIAL LINE MEASUREMENT DEVICE HAVING METAL STRIP FILTER

The invention described herein may be manufactured and used by or for the Government of the United States of America for governmental purposes without the payment of any royalties thereon or therefor.

Conventional time domain reflectometry equipment yields complex waveforms representing the characteristics of transmission lines under test. These waveforms are extremely difficult, if not impossible, to analyze in frequency domain terms. Therefore, the classical technique of inserting frequencies of known power levels and measuring the output levels with power bridges is normally used to see what the systems under test do at specific frequencies. The limitation of this technique is that it generally requires two people to accomplish the task, and these people must be skilled technicians experienced in the use of microwave test equipment. Also, under difficult environmental conditions, equipment will drift in calibration and cause errors. This is especially true when trying to analyze coaxial cables in aircraft and aboard ship.

The primary purpose of this invention is to provide a coaxial line measurement device that yields discrete frequencies from step functions obtained from existing time domain reflectometry equipment. By obtaining discrete frequencies, observable sine waves pass through the transmission line systems under test which make it possible to have reliable and convenient frequency domain analysis.

Briefly, the present invention comprises a coaxial line measurement device having a step function generator connected to the input of a coaxial line to be tested. The output of the coaxial line is connected to a sinusoid impedance anomoly device having a metal strip that has a physical configuration corresponding to the signal to be filtered. The output of the sinusoid impedance anomoly device is connected to a switching device so that the coaxial cable can be open circuited, shorted or connected across a preselected impedance. The step function signal is filtered and then the filtered signal is reflected back through the coaxial line and is compared to a signal from the step function generator that has been filtered and reflected by the sinusoid impedance anomoly device when the coaxial line is removed. The difference in the compared signals indicates the attenuation by the coaxial line under test. The device may be also used to measure the characteristics of antennas. This is achieved by measuring the amount of the energy from the filtered signal that is reflected back to the antenna. The magnitude of the reflected signal will indicate the efficiency of the antenna at the particular frequency.

Other objects, advantages and novel features of the invention will become apparent from the following detailed description of the invention when considered in conjunction with the accompanying drawings wherein.

Figure 1:
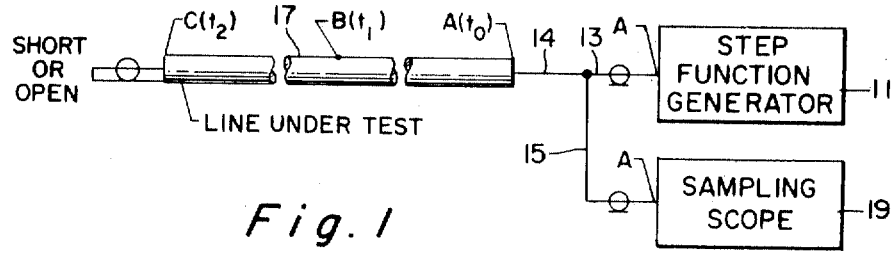
FIG. 1 is a block diagram illustrating a conventional coaxial cable testing device.
Figure 1A:
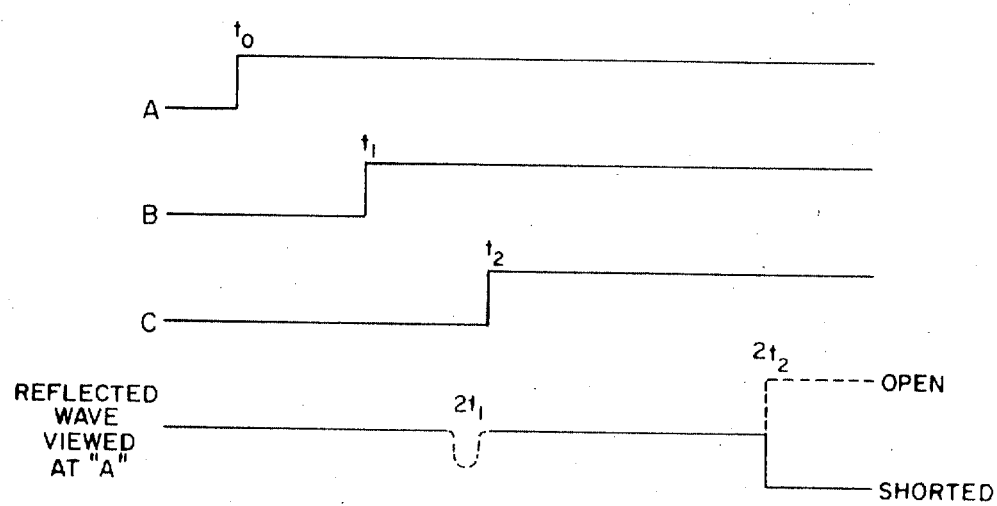
FIG. 1A is a set of curves illustrating the operation of the FIG. 1 device.

In FIG. 1 is illustrated a typical time domain reflectometer test arrangement used in conventional practice. The step function generator 11 generates a step function signal that is transmitted down coaxial lines 13, 14 and 15 and down coaxial line 17 which is the line under test. Coaxial lines 13, 14 and 15 are very short and may be only coaxial fittings and therefore do not introduce a measurable time delay function. Coaxial line 17 is the line under test and is often quite long, 100 feet, for example, and will introduce time delays that are easily measurable. Line 15 connects sampling scope 19 to the output of step function generator 11 and to the input of line 17. Line 17 is indicated as having points A, B and C which are arbitrary distance points on the line under test and indicate the beginning, middle and end of the line for purpose of illustration. The end of line 17 may be either open or shorted for purpose of testing. Referring now to the curves shown in FIG. 1A, curve A represents the step function signal at time $t_o$ (zero time) at the beginning of line 17. Curve B represents the step function signal at time $t_1$ at the middle of line 17 and time $t_2$ represents the time required for the step function signal to be transmitted from point A to point C.

After the step function signal has been transmitted down line 17 it is reflected back. The reflected wave is sampled by sampling scope 19 and a typical presentation is shown on the curve identified as "reflected wave received at A." If the end (point C) of line 17 is shorted the step function signal will be reflected back at an opposite polarity as illustrated by the solid line and will be received at the sampling scope at the time $2t_2$. If the end (point C) of line 17 is open the step function signal will be reflected back at the same polarity as illustrated by the dotted line and will be received by the sampling scope at the time $2t_2$. If there is a variation in impedance in line 17, for example, a decrease in impedance at point B, then there will be a reflected wave from point B which will be received by the sampling scope at time $2t_1$. By analysis of the curves viewed at the sampling scope, the nature of the impedance drop and the characteristics of line 17 may be computed. This is a very complex procedure and is further complicated because the leading edge of the step function signal includes a large frequency spectrum. Part of the procedure is to measure the slope and shape of the curves and resolve them by complex empirical relationships.

Figure 2:
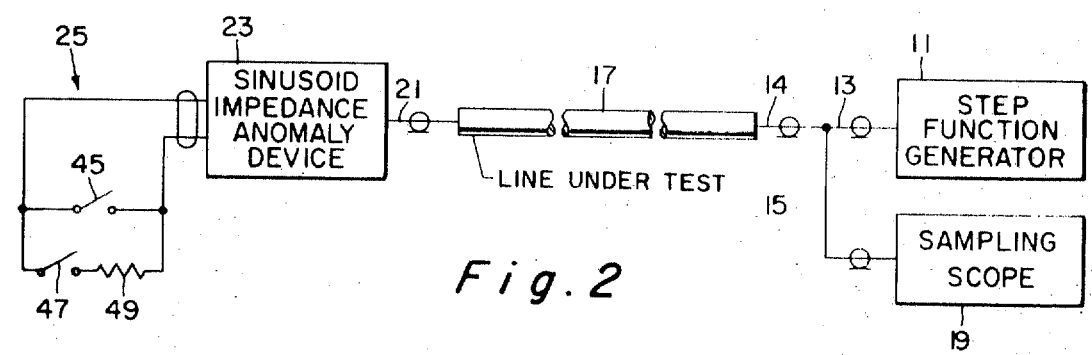
FIG. 2 is a block diagram illustrating the testing device of the present invention.

In FIG. 2 is illustrated a block diagram of the present invention. The step function generator 11 generates a step function signal that is transmitted down coaxial lines 13, 14 and 15 and down coaxial line 17 which is the line under test. Coaxial lines 13, 14 and 15 are very short lines and may be only coaxial fittings and therefore do not introduce a measurable time delay factor. Coaxial line 17 is the line under test and is often quite long and will introduce time delays that are easily measurable. Line 15 connects sampling scope 19 to the output of step function generator 11 and to the input of line 17. The end of test line 17 is connected to the input of a short coaxial cable or fitting 21 the output of which is connected to the input of sinusoid impedance anomoly device 23. The output of device 23 may be either shorted, open or have an impedance as provided by device 25 and as hereinafter explained in connection with the description of FIG. 3.

Figure 3:
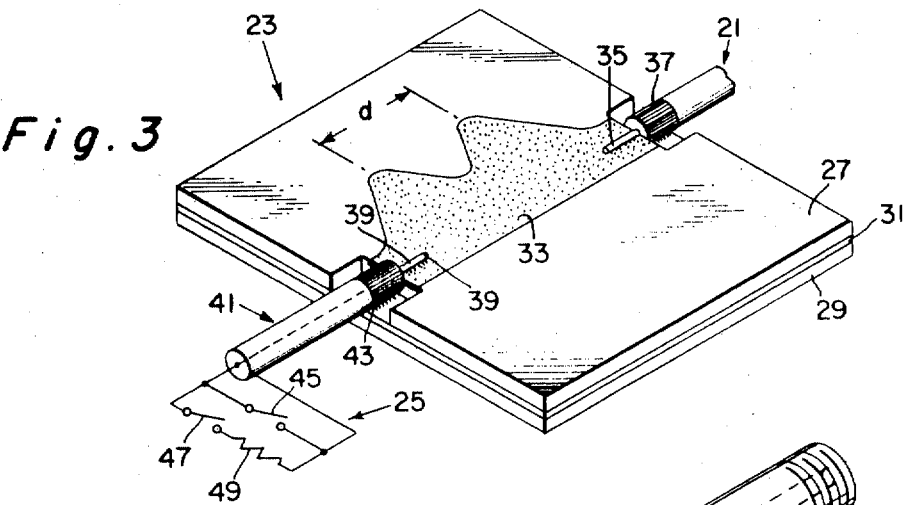
FIG. 3 is a drawing showing one embodiment of the sinusoidal impedances anomoly device of FIG. 2.
Figure 4:
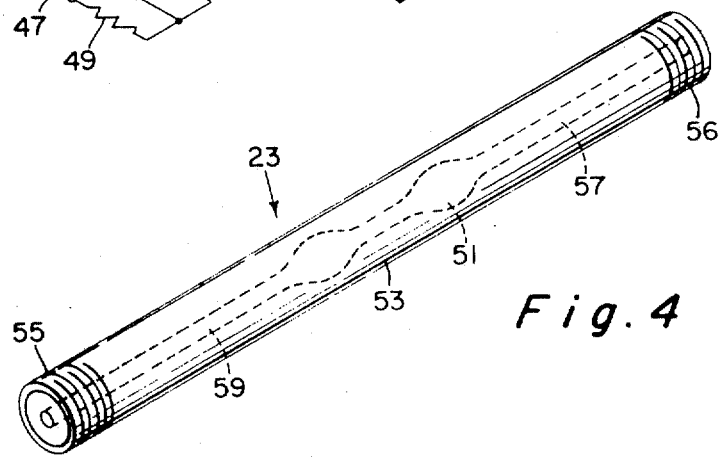
FIG. 4 is a drawing showing another embodiment of the sinusoidal impedance anomoly device of FIG. 2.

The details of two embodiments of sinusoid impedance anomoly device 23 are illustrated in FIGS. 3 and 4. The FIG. 3 device comprises an upper dielectric plate 27, lower dielectric plate 29 and sandwiched between these plates a thin layer of conducting material 31, such as copper clad. Another thin layer of conducting material 33, such as copper clad, is formed in the upper surface of upper dielectric plate 27 and is spaced from conducting material 31 by the remaining thickness of dielectric plate 27. Typical thickness of dielectric plates 27 and 29 are about one-sixteenth inch and of conducting materials 31 and 33 about 0.001 inch. Conducting material 33 is sized and shaped to provide a configuration that will extract or filter a particular signal of interest from the step function signal for measuring the characteristics of test line 17. For example, conducting material may have a sinusoidal shape where the peak to peak distance (d) is about 1 inch. The center conductor 35 of line 21 is connected to material 33 and the outer conductor 37 is connected to material 31. The center conductor 39 of line 41 is connected to material 33 and the outer conductor 43 is connected to material 31. Termination of line 41 is achieved by device 25 having switches 45 and 47 in parallel and resistor 49 in series with switch 47. When switch 45 is closed and switch 47 is open then conductors 39 and 43 are shorted. When both switches are open, as shown, the line 41 is open ended and when switch 45 is open and switch 47 is closed then resistor 49 is connected across conductors 39 and 43.

In FIG. 4 is shown another embodiment of sinusoid impedance device 23. In this embodiment the sinusoid strip 51 is positioned within and spaced from the walls of outer conductor 53 having threaded end fittings 55 and 56 for connection to other coaxial cables. Sinusoid strip 51 has one end connected to center conductor 57 and the other end to center conductor 59 and are mounted coaxially in end fittings 55 and 56 and are appropriately isolated from electrical connection by conventional techniques.

Figure 2A:
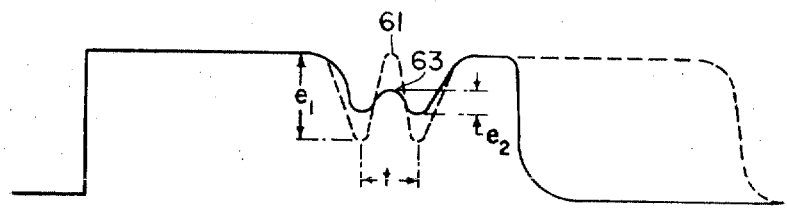
FIG. 2A is a set of curves illustrating the operation of the FIG. 2 device.

Referring to FIGS. 2 and 2A the operation of the present invention is as follows. The first step of the operation is to directly connect sinusoid device 23 to the output of step function generator 11 without line 17 being inserted therebetween. When device 23 is connected directly to the output of generator 11 the reflected signal from device 25 that is received by sampling scope 19 will be dotted line 61 having the single frequency as determined by the dimensions of device 23. All of the outer complex frequencies of the leading edge of the step function signal are rejected or filtered out by sinusoid device 23. The scope may be adjusted to set the peak to peak voltage $e_1$ to be 1 volt, for example. The next step is to insert the test line 17 between sinusoid device 23 and step function generator 11 as shown in FIG. 2. Then the step function signal is generated which results in a reflected wave, as illustrated by solid line 63, being received on sampling scope 19. This reflected wave has a peak to peak voltage of $e_2$. From this the frequency of the signal being transmitted and reflected back through test line 17 is $f=1/t$ where $t$ is the time interval between peaks as shown in the curves. Also the round trip attenuation ($DB_{AT}$) of the selected test signal $f$ through test line 17 is defined by the relationship:

$$DB_{AT}=20\ LOG_{10}(e_1/e_2)$$

In this manner the required information about test line 17 is obtained in a very simple and reliable manner.

Figure 5:
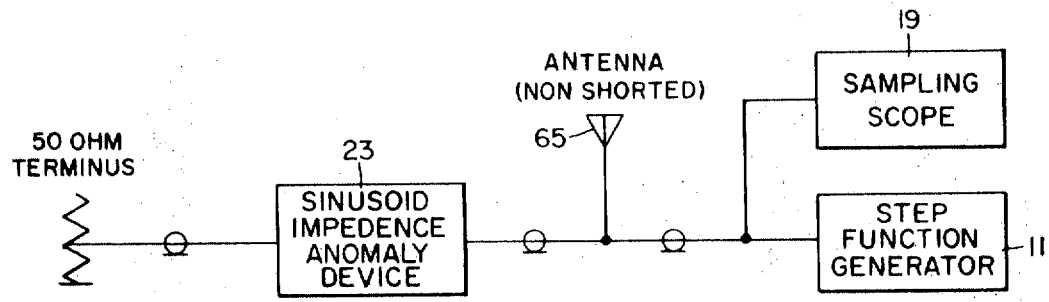
FIG. 5 is a block diagram of the present invention when used to measure the characteristics of an antenna.
Figure 5A:
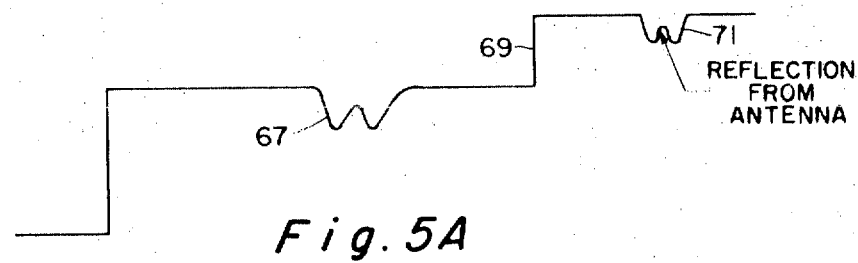
FIG. 5A is a set of curves illustrating the operation of the FIG. 5 device.

In FIGS. 5 and 5A is illustrated the operation of the present invention when used to measure the characteristics of an antenna 65. The curves shown in FIG. 5A show the signals received by sampling scope 19. Curve 67 represents the reflected wave from the output of device 23 back to the scope 19. Curve 69 represents the reflection of the leading edge of the step function signal from the antenna 65. Curve 71 represents the single frequency signal that is reflected from device 23 back to the antenna which then reflects it back to sampling scope 21. If the antenna is not matched to the frequency of device 23 then the antenna will reflect back nearly all of the signal to sampling scope 19 and curve 71 will have maximum amplitude. However, when the antenna is tuned to the signal of device 23 then the antenna will radiate this signal and the reflected signal 71 will be attenuated. The amount of the reflected signal will indicate the efficiency of the antenna at the particular frequency.

Obviously many modifications and variations of the present invention are possible in the light of the above teachings. It is therefore to be understood that within the scope of the appended claims the invention may be practiced otherwise than as specifically described.

What is claimed is:
1. A measurement device comprising:
   a. first means for generating an electrical signal having a plurality of frequencies;
   b. second means for applying said signal to the input of a device to be tested;
   c. a metal strip having a physical configuration and dimensions for passing only that frequency of said electrical signal that coincides with the physical configuration and dimensions of said strip;
   d. said metal strip for being connected to the output of said device to pass only one frequency of said electrical signal; and
   e. third means operatively connected to the input of said device for observing said electrical signal.
2. The device of claim 1 wherein:
   a. said first means is a step function generator; and
   b. said device to be tested comprises an antenna having its input operatively connected to the output of said step function generator, to the input of said metal strip and to the input of said third means.
3. The device of claim 1 wherein:
   a. said first means is a step function generator;
   b. said device to be tested comprises a coaxial line having its input connected to the output of said step function generator and to the input of said third means, and having its output connected to the input of said metal strip.
4. The device of claim 3 wherein:
   a. the output of said metal strip is connected to a device for selectively shorting or opening said coaxial line or for providing a preselected impedance across said coaxial line.
5. The device of claim 1 wherein:
   a. said metal strip has a sine wave configuration where the distance between the peaks of said sine wave is about 1 inch.
6. The device of claim 1 wherein:
   a. two dielectric sheets;
   b. said metal strip comprises a thin metal sheet positioned between two dielectric sheets and said metal strip positioned on the outside surface of one of said dielectric sheets; and
   c. said outer conductor of said coaxial line being operatively connected to said thin metal sheet.

* * * * *